United States Patent Office 3,788,927
Patented Jan. 29, 1974

3,788,927
METHOD OF MAKING A REINFORCED LAMINATE IN COMBINATION WITH A CORE MATERIAL
Peter L. Jurisich, 4731 Royce Road, Irvine, Calif. 92804
No Drawing. Application Dec. 1, 1969, Ser. No. 881,318, which is a division of application Ser. No. 745,381, July 17, 1968, both now abandoned. Divided and this application Aug. 17, 1971, Ser. No. 172,547
Int. Cl. B32b 31/00, 3/12, 17/04
U.S. Cl. 156—290                      5 Claims

ABSTRACT OF THE DISCLOSURE

A reinforced structure and method in which a body consisting of fibers which are woven or unwoven, which fibers have spaces between them, has a cured resin coating the fibers but not filling the spaces between them, and in which an uncured resin is applied to the body. This uncured resin may be impregnated into the body to fill the spaces between the fibers or the uncured resin may be applied to a surface of the body, the resin being of such a character that upon heating it will flow into and fill the spaces.

This application is a divisional application of Peter L. Jurisich, inventor, filed Dec. 1, 1969, bearing Ser. No. 881,318 now abandoned, which was a division of application Ser. No. 745,381, filed July 17, 1968, also abandoned.

BACKGROUND OF THE INVENTION

The present invention relates to a reinforced plastic laminating material and method of making the same which is useful in the manufacture of high strength lightweight structures of parts which may consist of sheets used as single sheets, pluralities of sheets, or composite laminated structures, such, for example, as a structure comprising a pair of facing members having an intermediate cellular core. As an illustration of the utility of my invention, it is the practice in the art to make a composite sandwich structure in which resin-impregnated glass fiber fabric is molded to both surfaces of a sheet of low-density core material called honeycomb core. This one-step manufacturing process produces structural facings as well as structural bonds of the facings to the core. At the present time, the materials being used suffer from the following four critical defects:

(1) It is very difficult to product flat, void-free surfaces that are inherently decorative, or that can be easily painted to obtain decorative surfaces;

(2) During the application of bonding pressure, the unit pressure over the sharp edges of the honeycomb is very great. This damages a certain percentage of the small glass fibers making up the woven fabric, so that the structural integrity of the finished product is questionable. The same type of damage also occurs during the laminating of solid sheet material from one or more plies of resin-impregnated glass fabric;

(3) Resins that are capable of providing adequate bonds to cellular core materials, such as honeycomb core, may not necessarily have all the other properties needed in the completed laminate for specific end uses; and (4) The resin-impregnated glass fabric handles much like unimpregnated glass fabric—it is difficult to cut, it doesn't hold its size and shape after cutting, and it is difficult to move from cutting table to layup area without distorting the shape. Also, during handling much fiber damage occurs, compromising ultimate strength of the finished products.

SUMMARY OF THE INVENTION

My invention provides a sheet or body comprising woven or unwoven glass fibers, cellulose fibers, synthetic fibers, or metallic and other non-metallic fibers, which sheet or body is useful in making composite laminated structures which may be of various sizes or shapes and which are of lightweight and high strength and have the following features and advantages over the prior art:

(1) The resin impregnated fabric can be stiff enough to stay flat while being bonded to honeycomb core materials;

(2) The fibers of the fabric are supported by one another so that they are not damaged during handling and laminating cure cycles;

(3) Extreme flame retardancy or other desirable chemical properties are attained with an initial impregnated resin that may not be attainable with the laminating resin system;

(4) The fabric can be still completely porous so that the final laminating resin can impregnate throughout the fabric with usual or special resins which may flow through during the final laminating process in the desired manner, or may be surface applied for subsequent impregnation when the ultimate articles are formed.

It is an object of my invention to provide a reinforced structure and method of making same in which a glass fabric or other body of material of the types referred to heretofore, before any handling of the body which may damage or break the fibers, is provided with a cured resin coating which coats each of the fibers but leaves spaces between them, and in which an additional uncured resin is applied to the sheet or body in an amount to give the body the desired or necessary weight factor.

The plastic sheet is now ready for use in the manufacture of various lightweight high strength articles as referred to heretofore, and there is no danger of fiber breakage and the product of my invention has the advantages pointed out heretofore.

DESCRIPTION OF THE PREFERRED EMBODIMENTS

As a specific example, a sheet of fiberglass received from the manufacture before it is handled or subjected to any conditions which would be likely to cause fiber damage, is submerged in a liquid solution which may have a resin content selected to yield a cured resin content of 15 to 20%, which is sufficient to protect the fibers and to achieve the advantages previously pointed out. Any layer of cured resin greater than this amount could be a weight disadvantage. This solution impregnates the glass fabric by entering into the spaces between the fibers and saturating each of the fibers. The moisture is then removed from the fabric sheet by any suitable drying process which may involve heat, or by otherwise evaporating the moisture from the solution. When the moisture has been removed the fibers are coated with resin which adheres to the surfaces thereof. The fiberglass sheet, with its fibers coated with the uncured resin, is then subjected to a curing temperature such, for example, within the range of 280° to 320° F. where a phenolic-type of resin is used. This curing step is effected by placing the sheet in an oven or, if the sheet is in a long strip, by passing the strip continuously through the heating zone of a continuous oven having an inlet and an outlet for receiving and discharging the fiberglass sheet.

The sheet of glass fabric now has cured or substantially cured resin applied to the surfaces of all of the fibers; but there are spaces between the fibers so that the sheet is a substantially porous sheet.

As stated heretofore, the protection for the fibers and the obtaining of the desired strength and other structural properties has been satisfactorily attained in practice by applying a plastic coating of between 15 to 25% by weight. This percentage, however, may be varied by the particular demands of the final production for which the plastic sheet is used and may be influenced by fiber size or coarseness of weave, size of spaces between the fibers, or the weight-factors involved.

The sheet is then subjected to further treatment by applying to it an additional resin which will supply the remainder of the required resin content, here again depending upon the particular use or specifications of the finished product. In practice it has been found satisfactory to add sufficient resin to bring the resin weight up to 40 to 50% of the weight of the final product. This additional resin may be in solution form and may be impregnated into the fabric by submersion in a solution of the resin. After submersion the liquid of the solution is removed by a drying or evaporating process. The desired weight may be obtained by one submersion or by a plurality of submersion and drying steps. Alternatively, the resin may be applied to the surface of the fiber glass sheet as a coating, in which event the resin will not, at this time, enter the spaces. The resin, however, must be of a type which melts under heat so that when the sheet is used in the forming of light-weight high strength articles heat may be applied which will cause the resins to suitably bond together a plurality of parts, and, at the same time, cause the resin to flow into the spaces in the sheet and be cured in place.

The glass fabric sheet which has been coated with the stiffening resin can have the increased resin of the final product applied after the sheet has been placed in situ on the honeycomb core during the layup process.

The glass fabric sheet, after it has had the uncured resin applied to it, is ready for use. It may be handled and used without danger of fiber damage, and has all of the advantages heretofore pointed out. The product of my invention may be immediately used for manufacturing purposes, or it may be stored and later used when the occasion arises.

The glass fabric sheet, as previously stated, when used with an open core structure such as honeycomb is subject to substantial stress and crushing where the fabric is adjacent the walls of the honeycomb. This invention substantially eliminates stressing and crushing of the glass fibers over the walls of the honeycomb structure. By causing the fabric to lay in a flattened or stiffened position over the walls and openings of a core, there is less of a tendency to crush the glass fibers on the walls thereof during pressing or layup operations. The flattened or stiffened sheet lays in an advantageous position on the major face of the open core structure without sagging into the respective pores and openings thereof. Thus, a substantially undamaged sheet is provided placed in a favorable position for receiving stresses, thereby creating a superior laminate.

My invention permits many variations in order to obtain special properties both during processing and in the final end use. The first step resin can consist of different portions of the total final resin content desired, or any organic or inorganic resins or cements, or several different resins installed in one or more separate steps. The second step resin can be varied the same as the first step, but it is left uncured until the final laminating cure cycle. The second step resin system may be applied in more than one step. Combinations of resins may be used wherein the first step resin co-reacts with the second step to varying degrees.

I claim:

1. A method of making a reinforced laminate having a fiber glass sheet in combination with a core material having openings exposed to said sheet comprising:
   providing a sheet of fiber glass with a solution containing a first resin to coat at least in part the fibers thereof;
   curing the first resin to provide the fibers with at least a partial coating of cured resin to substantially stiffen them, while leaving a majority of spaces between the fibers unfilled with the first cured resin and open between each major face of the sheet;
   filling the spaces between the fibers with a second uncured resin after curing the first resin;
   spanning the openings of the core material with the fiber glass sheet; and,
   adhering the fiber glass sheet to the core material.

2. A method of making a reinforced laminate as claimed in claim 1 further comprising:
   adhering the fiber glass sheet to the core material by curing and adhering the second resin thereto.

3. A method of making a reinforced laminate as claimed in claim 1 further comprising:
   providing a sufficient quantity of said first resin to substantially bind all of the fibers in said fiber glass sheet with respect to each other after curing.

4. A method of making a reinforced laminate as claimed in claim 1 further comprising:
   filling the spaces between the fibers with said second uncured resin to provide a relatively smooth surface to said laminate upon cure.

5. A method of making a reinforced laminate as claimed in claim 1 wherein:
   said first resin is provided in a solution of between 15 and 25% resin content.

References Cited
UNITED STATES PATENTS

| | | | |
|---|---|---|---|
| 2,477,852 | 8/1949 | Bacon | 161—68 |
| 2,649,396 | 8/1953 | Witt et al. | 161—93 X |
| 3,502,533 | 3/1970 | Reiss | 117—76 P X |
| 3,044,919 | 7/1962 | Stoneburner | 161—DIG. 4 |
| 3,686,021 | 8/1972 | Lee | 117—76 T |

PHILIP DIER, Primary Examiner

U.S. Cl. X.R.

117—76; 161—68, 159, DIG. 4